United States Patent Office 3,279,205
Patented Oct. 18, 1966

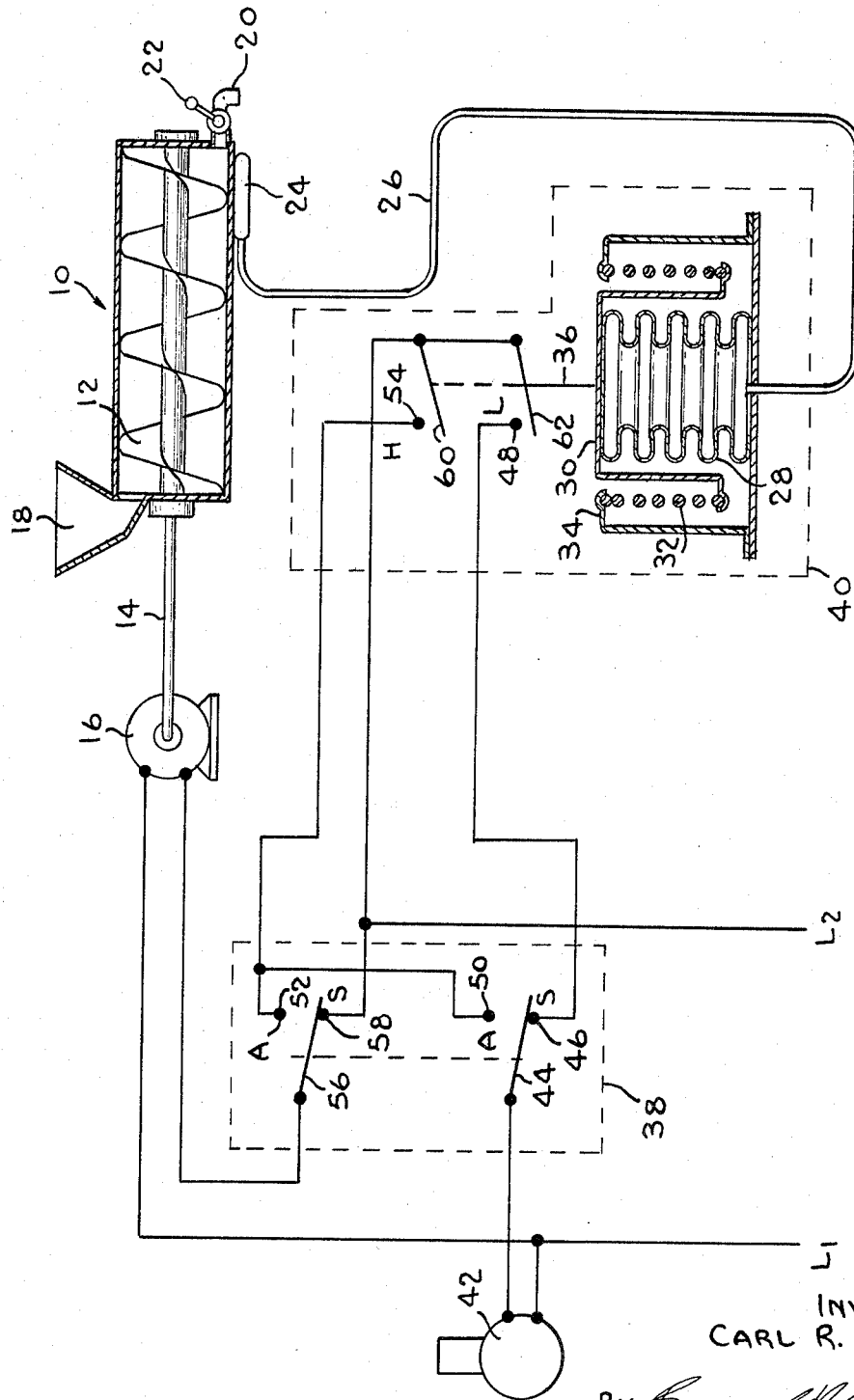

3,279,205
SOFT SERVE FREEZER CONTROL
Carl R. Stoelting, Kiel, Wis., assignor to Stoelting Brothers Company, Kiel, Wis., a corporation of Wisconsin
Filed Dec. 18, 1964, Ser. No. 419,386
1 Claim. (Cl. 62—135)

This invention relates to soft serve freezers of the type used to manufacture and dispense products such as frozen custard, ice cream, ice milk, and the like. More particularly, this invention relates to control of the refrigeration of soft serve freezers.

At the present time soft serve freezers are equipped with a thermostatic control which will operate the motor which drives the agitator or beater and will also control operation of the compressor so as to maintain a desired degree of refrigeration of the contents of the freezer so that the consistency will be correct for proper vending. These freezers customarily have a mix inlet at one end and a discharge at the other end. During periods of high consumption or dispensing the incoming mix will tend to warm the entire freezer, particularly since the sensing unit is usually at the dispensing end. Therefore, this can and frequently will result in too soft a product coming out of the machine. To overcome this problem the present practice is to provide a switch for overriding the thermostatic control so that the agitator and compressor will run continuously. The problem with this system is that sometimes the operator forgets to open the switch as the rate of dispensing falls off and the contents freeze solid.

The principal object of this invention is to provide a control system for soft serve freezers which overcomes the problem as outlined above.

Another object of this invention is to provide a freezer with two operational states, one a normal state in which the normal thermostatic control regulates the machine and another operational state for high demand in which the thermostatic control is made to control at a lower temperature to, in effect, anticipate the increased demand.

Other objects and advantages will be pointed out in, or be apparent from, the specification and claim, as will obvious modifications of the single embodiment shown in the drawing, in which:

In the drawing the single figure is a schematic and diagrammatic representation of the control system and freezer.

The soft serve freezer includes an insulated freezing cylinder or chamber 10 in which an agitator or beater 12 is mounted on shaft 14 driven by motor 16. The agitator or beater can be of any of the various designs such as an auger, paddles, or the like. The liquid mix is fed into the left end of the freezing cylinder through container or hopper 18 or the like and the frozen mix is dispensed through spigot 20 under control of a valve regulated by the handle 22.

A thermostatic feeler bulb 24 is mounted adjacent the dispensing end of the cylinder and is connected by capillary tube 26 to the interior of bellows 28. The bellows 28 is surmounted by a suitable cup-like support 30 against which spring 32 is seated to oppose increases in the pressure within the bellows 28 as the bulb temperature rises. The other end of the spring seats on a suitable seat 34. The support 30 is provided with a bellows pin 36 which is operatively connected to the two snap switches designated H and L. The pin 36 is connected to the switches so as to actuate them sequentially whereby the switch H will maintain a temperature 7° F. above that which would be maintained by switch L. In other words, the switches are set to operate with a 7° differential.

A manually operated double pole double throw switch 38 is connected to the thermostatic switch 40 and to motor 16 and compressor 42. Thus, blade 44 is connected to one side of the compressor while the other side of the compressor is connected to the power line L1. Blade 44 can make contact with contact 46 or S which, in turn, is connected to contact 48 of switch L. Blade 44 can also make contact with contact A or 50 which is connected to the contact A or 52 and to contact 54 of switch H. The switch blade 56 can contact either contact A (52) or contact S (58) connected to line L2 and to contacts 60, 62 in switches H and L, respectively.

When it is desired to dispense the soft serve product at a rapid rate the manual switch 38 is moved to the position S (Serve) as shown in the drawing. It will be noted that this places the motor 16 directly across the line L1, L2 by reason of blade 56 contacting contact 58. The compressor, however, is now under control of switch L in the thermostatic switch and when this switch is closed the compressor will run. As noted above, the switch L is set to give a temperature some 7° below the usual temperature. Even if the operator forgets that he has moved the manual switch 38 to the S position this temperature will not be low enough to freeze the contents of the cylinder 10 solid since the agitator will be running continuously. In periods of low demand the manual switch should be moved to the A (Automatic) position and in which the motor and compressor are controlled by the switch H in the thermostatic switch 40. Under these conditions the contents of the freezing cylinder will be maintained at a slightly higher temperature which will insure ideal consistency. As noted above, if the manual switch is on the S contact the lower temperature would prevail and in slack periods this could result in the mix becoming firm but not so hard as to prevent operation of the beater or prevent dispensing.

Although but a single embodiment of the present invention has been illustrated and described, it will be apparent to those skilled in the art that various changes and modifications may be made therein without departing from the spirit of the invention or from the scope of the appended claim.

I claim:
The combination with a soft serve freezer of the type having a freezing cylinder provided with an agitator therewithin and freezing coils thereabout, a motor for driving the agitator, a compressor for supplying refrigerant to the freezing coils and a motor driving the compressor, of means for controlling operation of the agitator motor and compressor motor comprising, thermostatic switch means including, a thermal sensor actuating motor means, two switches serially operated by the motor means at a predetermined temperature differential, manual switch means for connecting the compressor motor to either of said switches for control thereby, and for connecting the agitator motor across the power line for continuous operation when the compressor motor is connected to the switch operating at the lower temperature or for connecting the agitator motor to the other switch when the compressor motor is connected thereto whereby the agitator motor and compressor motor are controlled thereby to maintain a higher temperature.

References Cited by the Examiner
UNITED STATES PATENTS

| | | |
|---|---|---|
| 1,693,677 | 12/1928 | Swift. |
| 2,687,019 | 8/1954 | Swenson _____ 62—135 X |
| 2,949,748 | 8/1960 | Gangi _____ 62—342 X |

ROBERT A. O'LEARY, Primary Examiner.
W. E. WAYNER, Assistant Examiner.